May 26, 1964  J. CADIOU  3,134,605
SWINGING ARM MOUNTING OF INDEPENDENT WHEEL SUSPENSION SYSTEM
Filed April 17, 1962
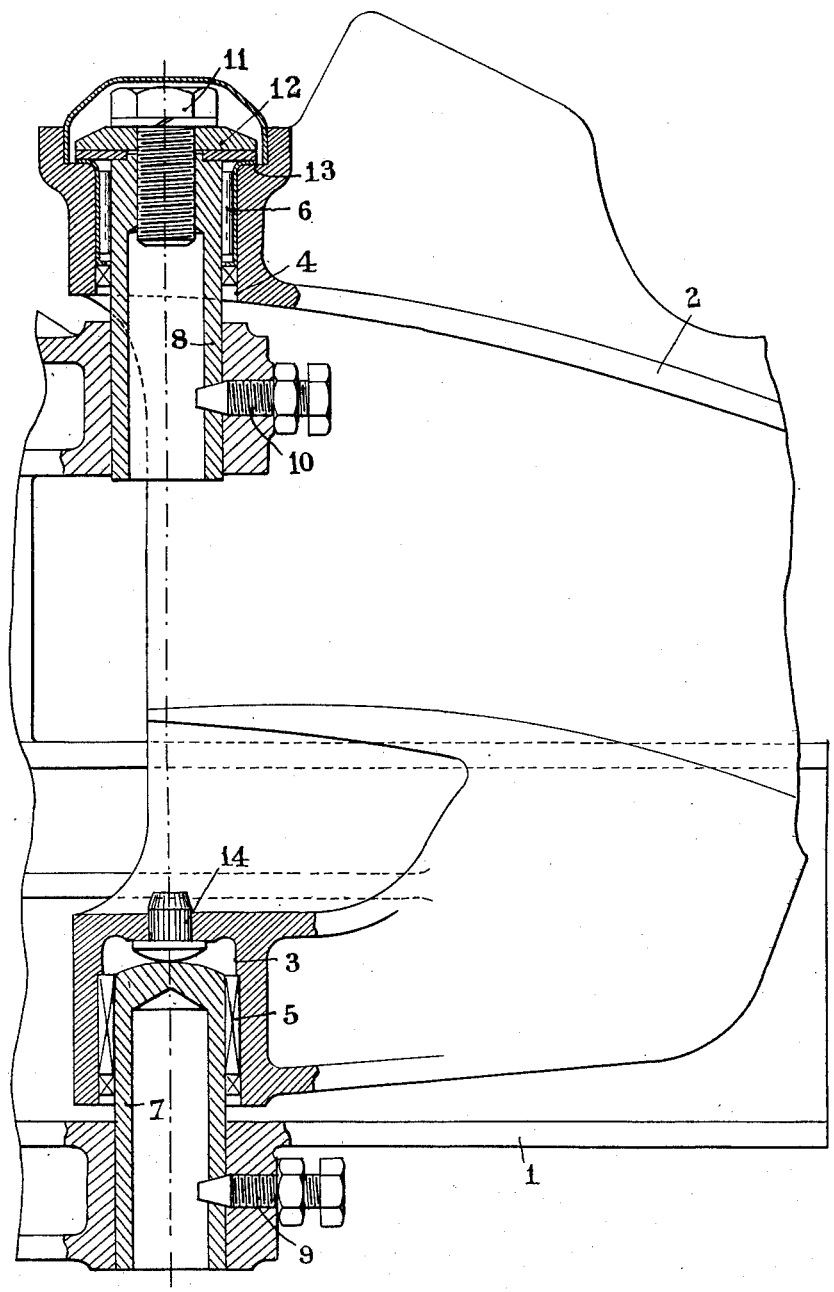

United States Patent Office 3,134,605
Patented May 26, 1964

3,134,605
SWINGING ARM MOUNTING OF INDEPENDENT
WHEEL SUSPENSION SYSTEM
Jean Cadiou, Paris, France, assignor to Societe Anonyme
Andre Citroen, Paris, France
Filed Apr. 17, 1962, Ser. No. 188,153
Claims priority, application France Apr. 18, 1961
2 Claims. (Cl. 280—96.1)

In independent wheel suspension systems of automotive vehicles the wheel axles consist in general of swinging arms pivotally mounted on shafts extending at right angles to the longitudinal plane of the vehicle.

In frequnent cases the pivotal mounting of these arms about their axis of rotation comprises journals of relatively large size necessitating the use of very large bearings.

On the other hand, assembling these elements involves sometimes rather time-robbing operations or delicate adjustments.

The assembly according to this invention is advantageous in that it permits on the one hand a quick mounting and on the other hand to dispense with large-sized and delicate parts, so that a more economical construction can be contemplated.

The trunnions, journals or pivots for the pivotal mounting of a wheel swinging arm according to this invention are divided into two coaxial elements disposed at a sufficient axial distance from each other to ensure a good stability while limiting to reasonable values the radial stress on said trunnions.

The two trunnion elements are carried by the frame or body structure of the vehicle and are so secured thereon as to avoid under load any elastic deformation of the zone concerned with the fitting of these trunnions. The fitting is so made that the free or mounting ends of the trunnions are directed in the same direction or project from the same side, like the hinge-pins of a door.

On the other hand, the wheel-supporting swinging arms are each formed with two bores adapted to engage the two trunnion elements when they are brought to their mounting or final position. A retaining means is provided for holding in proper axial position the swinging arm mounted in the trunnions.

In order to afford a clearer understanding of the invention and to the manner in which the same may be carried out in practice, reference will now be made to the single figure of the accompanying drawing wherein there is shown a plan view, partially in section, of a device embodying features of the present invention for pivotally mounting a carrier arm of an independent wheel on a vehicle frame.

The frame or body structure of the vehicle is designated by the reference numeral 1, the pivoted end of a swinging arm by which one of the wheels of the vehicle is supported being partly shown at 2. A pair of coaxial bores 3, 4 formed in this arm are adapted to receive bearings 5, 6 engaged by trunnions 7, 8 carried by the frame or body 1 of the vehicle and secured thereon through any suitable means, for example set screws 9 and 10.

It will be seen that after fitting the trunnions 7, 8 in their bores the arm 2 can be mounted by bringing the same to a position of axial alignment therewith, whereafter the bores 3, 4 with their bearings 5, 6 are caused to slide over the registering free ends of their trunnions 7, 8 respectively.

The swinging arm is retained in its proper axial position by means of a member fastened to each trunnion and locking the arm against movement in a direction away from the trunnion.

Thus, a screw 11 having a relatively large head may be either tightened against the outer end face of the trunnion or caused to clamp thereagainst a washer or set of washers, or a ball thrust bearing 12, while covering the outer periphery 13 of the bore 4 formed in swinging arm 2.

On the other hand the movements of the arm are limited by any suitable and known antifriction device, for example a hard-metal stud 14 fitted in the bottom of the bore 3.

Of course, various modifications may be made in the embodiment shown and described herein without departing from the spirit and scope of the invention as set forth in the appended claims.

What I claim is:

1. A device for pivotally mounting a carrier arm of an independent wheel on a vehicle frame, which comprises two hollow coaxial trunnions mounted in relative axial alignment on said frame, members for locking said trunnions on said frame, a cylindrical bore formed through one end of said wheel carrier arm and adapted to fit over one of said trunnions, an antifriction member secured in the bottom of said bore and engaging said one trunnion, a cylindrical reamed bore drilled through the adjacent end of said wheel carrier arm coaxially to said first-mentioned bore and adapted to fit over the other trunnion, a bearing disposed between each bore and the relevant trunnion, a tapped hole formed coaxially through said other trunnion, a thrust washer covering said other trunnion and its bore, and a lock screw for locking said washer in position on said other trunnion.

2. In a vehicle suspension system, a swinging arm mounting of an independent wheel which comprises two coaxial trunnions mounted in axial alignment and in the same direction on the frame of the vehicle, one of said trunnions being hollow and internally threaded, means for locking said trunnions on said frame, a cylindrical hole formed in one end of said swinging arm and bored for receiving said one trunnion, a stop member carried by said one trunnion and covering the outer periphery of said hole in said swinging arm, a screw threaded in said one trunnion, and locking said stop member on said one trunnion and a cylindrical bore formed in the adjacent end of said swinging arm and adapted to fit over the other trunnion.

References Cited in the file of this patent

UNITED STATES PATENTS

| | | |
|---|---|---|
| 720,663 | Burgess | Feb. 17, 1903 |
| 2,303,545 | Graham | Dec. 1, 1942 |
| 2,613,091 | Funnell | Oct. 7, 1952 |
| 2,780,830 | Kammerer | Feb. 12, 1957 |
| 2,795,412 | Waisner | June 11, 1957 |

FOREIGN PATENTS

| | | |
|---|---|---|
| 1,036,377 | France | Apr. 22, 1953 |